United States Patent [19]
Rucker et al.

[11] Patent Number: 5,908,548
[45] Date of Patent: Jun. 1, 1999

[54] AROMATIC SOLVENTS HAVING ALIPHATIC PROPERTIES AND METHODS OF PREPARATION THEREOF

[75] Inventors: Christopher S. Rucker, Vicksburg; Steven J. Wantling; H. Don Davis, both of Brandon; Jimmy Rasco, Vicksburg, all of Miss.

[73] Assignee: Ergon, Incorporated, Jackson, Miss.

[21] Appl. No.: 08/821,471

[22] Filed: Mar. 21, 1997

[51] Int. Cl.⁶ .......................... C10G 17/00; C10G 45/00
[52] U.S. Cl. .......... 208/212; 208/366; 208/210; 208/14; 208/209; 208/309; 585/1
[58] Field of Search .................... 208/212, 209, 208/14, 309, 366; 585/1

[56] References Cited

U.S. PATENT DOCUMENTS

| | | | |
|---|---|---|---|
| 3,637,485 | 1/1972 | Salka | 208/347 |
| 3,666,659 | 5/1972 | Carlson | 208/211 |
| 3,926,785 | 12/1975 | Sigel | 208/212 |
| 4,033,784 | 7/1977 | Lawson et al. . | |
| 4,087,512 | 5/1978 | Reese et al. . | |
| 4,108,681 | 8/1978 | Lawson et al. . | |
| 4,130,476 | 12/1978 | Loboda | 208/212 |
| 4,424,115 | 1/1984 | Farrel | 208/89 |
| 4,822,480 | 4/1989 | Harandi | 208/212 |
| 4,979,447 | 12/1990 | Farrar . | |

*Primary Examiner*—Helane Myers
*Attorney, Agent, or Firm*—Nilles & Nilles, S.C.

[57] ABSTRACT

An aromatic solvent together with methods for its preparation are described. A composition includes a paraffin fraction in an amount of from approximately 9 LV % to approximately 15 LV %; a naphthene fraction in an amount of from approximately 35 LV % to approximately 55 LV %; and an alkylbenzene fraction in an amount of from approximately 8 LV % to approximately 16 LV %. The solvent provides advantages in that the high solvency that is typical of an aromatic solvent is combined with a narrow distillation range, a high flash point and higher boiling range that is typical of an aliphatic solvent.

31 Claims, 8 Drawing Sheets

AROMATIC SOLVENTS HAVING ALIPHATIC PROPERTIES AND METHODS OF PREPARATION THEREOF

BACKGROUND OF THE INVENTION

1. Field of the Invention

The present invention relates generally to the field of organic solvents. More particularly, the present invention relates to aromatic solvents having aliphatic solvent properties. Specifically, a preferred embodiment of the present invention relates to a naphthenic solvent with high solvency having the aliphatic solvent properties of high boiling range, narrow distillation range, and high flash point. The present invention thus relates to aromatic solvents of the type that can be termed aliphatic-like.

2. Discussion of the Related Art

Historically, it was known in the prior art to prepare both aromatic and aliphatic organic solvents from petroleum feedstocks. Aromatic solvents are nonsaturated cyclic compounds and have an odor. Compositions that contain more than approximately 50% aromatic compounds usually have a strong odor. Conventional aromatic solvents typically have a narrow boiling range, a low flash point and high solvency.

In contrast to aromatic solvents, aliphatic solvents are acyclic, (i.e., open-chain carbon compounds) and have some odor. Compositions that contain predominantly aliphatic compounds usually have a mild odor. Conventional aliphatic solvents typically have a wide boiling range, a high flash point and limited solvency.

A previously recognized problem has been that the desirable aromatic solvent characteristic of high solvency and narrow boiling range, on the one hand, and the desirable aliphatic solvent characteristics of higher boiling ranges and high flash point, on the other hand, are mutually exclusive. Heretofore, no composition having all these characteristics has been known. Such a solvent could act as a powerful solute vehicle across a relatively wide range of temperatures and without decomposing, except at high temperatures. What is needed therefore is a composition that combines the high solvency and narrow distillation range that is typical of aromatic solvents with the higher boiling ranges and high flash point that are typical of aliphatic solvents.

As is known to those skilled in the art, various petroleum refining by-products for which no high value added use is currently known are simply mixed with fuel oil and burned to obtain some economic value from them. However, merely burning these petroleum refining by-products is a relatively inefficient use of petroleum fractions that have undergone capital and energy intensive processing. Thus, another previously recognized problem has been that burning petroleum refining by-products as fuel is not an efficient use of these fractions. Needless to say, it is desirable to provide a refining process having higher over-all efficiency.

SUMMARY AND OBJECTS OF THE INVENTION

By way of summary, the present invention is directed to solvents having high solvency and narrow distillation range, a high flash point and a higher boiling range. The present invention is also directed to methods of making the solvents wherein the feedstock (FS) is block segregated by viscosity and the processing steps include a side draw from a wet bottom vacuum fractionating column.

A primary object of the invention is to provide a composition that combines the high solvency and narrow distillation range typical of aromatic solvents with the high flash point and high boiling range that are typical of aliphatic solvents. Another object of the invention is to provide a composition that is cost effective. It is yet another object of the invention to provide a composition that has one or both of the characteristics discussed above but which is relatively easy to prepare with a minimum of equipment.

In accordance with a first aspect of the invention, these objects are achieved by providing a composition comprising: a paraffin fraction in an amount of from approximately 9 LV % to approximately 15 LV %; a naphthene fraction in an amount of from approximately 35 LV % to approximately 55 LV %; and an alkylbenzene fraction in an amount of from approximately 8 LV % to approximately 16 LV %. In one embodiment, said composition is characterized by an ASTM D-86, 10 percent point of from approximately 480° F. to approximately 510° F., and, further comprising, an Indane fraction in an amount of from approximately 9 LV % to approximately 15 LV %.

Another primary object of the invention is to provide a method that can be used to prepare the above-discussed composition. It is another object of the invention to provide a method that is predictable and reproducible, thereby decreasing variance and operating costs. It is yet another object of the invention to provide a method that has one or both of the characteristics discussed above but which is relatively simple to set up and implement using moderately skilled workers.

In accordance with a second aspect of the invention, these objects are achieved by providing a method comprising: charging a reactor with a source of at least one block segregated feedstock and a source of hydrogen; producing hydrogen sulfide by reacting the at least one block segregated feedstock with the hydrogen in said reactor; transferring reacted feedstock and hydrogen sulfide from said reactor to a steam stripping tower; removing hydrogen sulfide from said steam stripping tower; transferring desulfurized and sweet feedstock from said steam stripping tower to a wet bottom vacuum fractionating column having a side draw; and drawing said composition from said side draw. En one embodiment, said step of drawing includes controlling a temperature of said wet bottom vacuum fractionating column with an air cooled side draw recirculation spray.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein lie reference numerals designate the same elements in the several views, and in which.

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

The invention is directed to a combination of block segregated feedstock and hydroprocessing conditions coupled with controlled operation of a wet bottom vacuum fractionating column to provide a specific side draw composition by controlling the temperature of the incoming feed to the fractionating column for further processing through a subsequent column to yield a high flash point solvent without affecting significantly the lube yields. For the sake of clarity, the processing method will be described first, followed by a description of the resulting composition. Then, specific examples of the composition for which actual data is available will be described.

The Process

Figure 1:
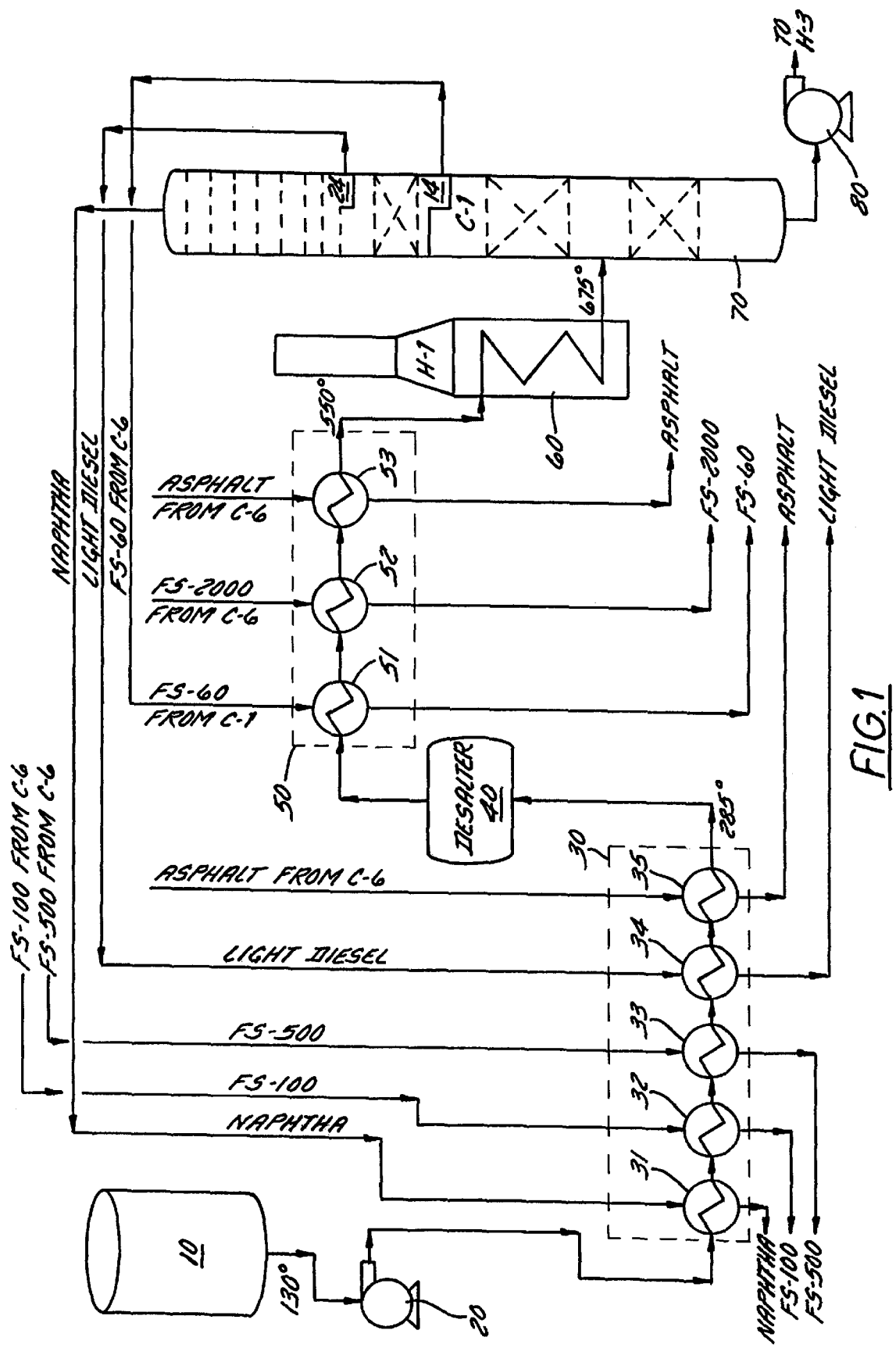
FIG. 1 illustrates a schematic view of an atmospheric distillation unit (ADU) according to the present invention.

Referring to FIG. 1, the atmospheric tower portion of a crude distillation unit (CDU) is depicted. Crude oil in a tank 10 is heated to approximately 130° and conveyed by a pump 20 to a bank of heat exchangers 30. A first heat exchanger 31 increases the temperature of the crude oil flow using energy from a naphtha fraction. A second heat exchanger 32 further increases the temperature of the crude oil flow using energy from an FS-100 viscosity fraction. A third heat exchanger 33 further increases the temperature of the crude oil flow using energy from an FS-500 viscosity fraction. A fourth heat exchanger 34 further increases the temperature of the crude oil flow using energy from a light diesel fraction. A fifth heat exchanger 35 further increases the temperature of Xtherude oil flow using energy from an asphalt fraction. After emerging from the fifth heat exchanger 35, the temperature of the crude oil flow is approximately 285° F. Although in this embodiment the bank of heat exchangers 30 includes five heat exchangers 31–35, it is within the level of ordinary skill in the art after having knowledge of the invention disclosed herein to recover heat from the various fractions and increase the temperature of the crude oil flow using any number of heat exchangers.

Still referring to FIG. 1, the crude oil flow from the first bank of heat exchangers 30 is then routed to a desalter 40. The desalter 40 functions by adding water to the crude oil flow in order to dissolve water soluble components thereof. After leaving the desalter 40, the crude oil is routed to a second bank of heat exchangers 50. A sixth heat exchanger 51 increases the temperature of the crude oil flow using energy from an FS-60 viscosity fraction. A seventh heat exchanger 52 increases the temperature of the crude oil flow using energy from an FS-2000 viscosity fraction. An eighth heat exchanger 53 increases the temperature of the crude oil flow using energy from an asphalt fraction. Although the preferred embodiment of apparatus shown in FIG. 1 depicts a second bank of heat exchangers 50 which includes three heat exchangers 51–53, it is within the level of ordinary skill in the art after having knowledge of the invention disclosed herein to increase the temperature of the crude oil flow that emerges from the desalter 40 using any number of heat exchangers. After leaving the second bank of heat exchangers 50, the temperature of the crude oil flow is approximately 550° F.

Still referring to FIG. 1, the crude oil flow from the second bank of heat exchangers 50 is then directed to a heater 60. The heater 60 is also denoted as H-1. The heater 60 increases the temperature of the crude oil flow to approximately 675°.

Still referring to FIG. 1, the crude oil flow is then directed to an atmospheric tower 70. The atmospheric tower 70 is also denoted as C-1 and has a plurality of trays including trays 14 and 24. As is well known to those of skill in the art, the heaver fractions of the crude oil flow migrate to the bottom of atmospheric tower 70. These heaver fractions are then conveyed by a pump 80 to a heater and vacuum tower unit (not shown in FIG. 1). The lighter fractions of the crude oil flow migrate to the upper regions of the tower 70. An FS-60 fraction is removed from the tower 70 at the tray 14. The FS-60 viscosity fraction from the tower 70 is then conveyed to the sixth heat exchanger 51. A light diesel fraction is removed from the tower 70 at the tray 24. The light diesel fraction from the tower 70 is then conveyed to the fourth heat exchanger 34. A naphtha fraction is removed from the crude oil flow at the top of the tower 70. The naphtha fraction from the tower 70 is then conveyed to the first heat exchanger 31.

Figure 2:
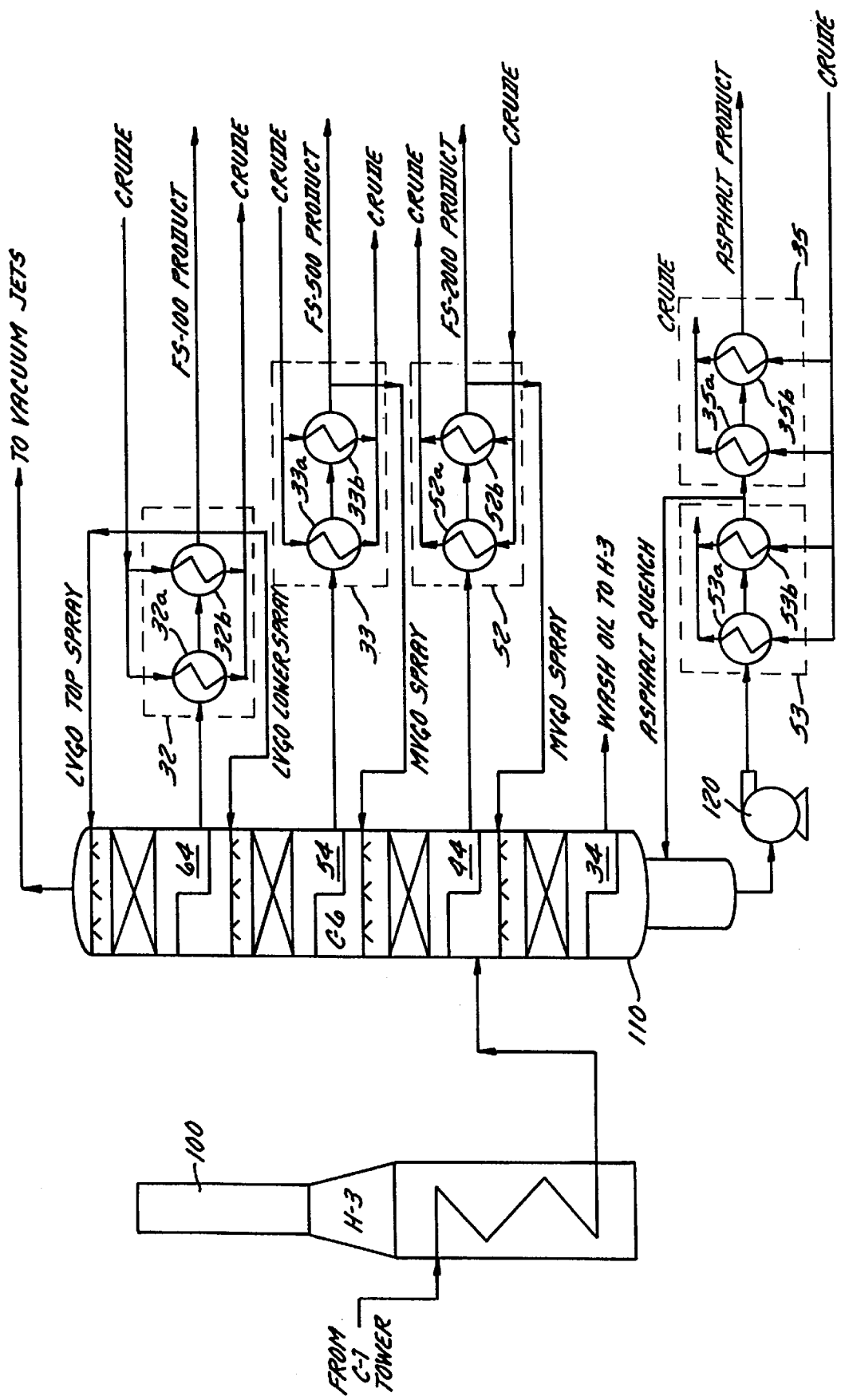
FIG. 2 illustrates a schematic view of a vacuum distillation unit (VDU) according to the present invention.

Referring now to FIG. 2, the heaver fractions from the atmospheric tower portion of the crude distillation units are conveyed to a natural gas fired heater 100. The heater 100 is also denoted as H-3. After being heated by heater 100, the heavier fractions are conveyed to a vacuum tower 110 having a plurality of trays 34, 44, 54 and 64. The vacuum tower 110 is also denoted as C-6. The heavy portions of the feed from the heater 100 go to the lower portions of tower 110. The heavy portions are contacted with an HVGO (high vacuum gas oil) spray which includes an FS-2000 viscosity fraction which is slightly lighter than the feed from the heater 100. A wash oil fraction is extracted from the tower 110 from the tray 34 and looped back to an inlet of the heater 100 through a return line (not shown). The remaining heavy portion moves toward the bottom of the tower 110 and is contacted by an asphalt quench. The quenched portion is then removed from the tower 110 by a pump 120. The quenched portion is an asphalt product that is conveyed to an eighth heat exchanger 53. In the depicted embodiment the eighth heat exchanger 53 is represented as two subheat exchangers 53a–53b. A portion of the asphalt product is returned to the tower 110 as an asphalt quench after passing through the eighth heat exchanger 53. The remaining asphalt product is then conveyed to the fifth heat exchanger 35 (previously described with regard to FIG. 1). In FIG. 2, the fifth heat exchanger 35 is represented as a series of subheat exchangers 35a–35b.

Still referring to FIG. 2, the lighter fractions in the flow to tower 110 move toward the upper regions of the tower 110. The FS-2000 viscosity product is removed from the tower 110 at the tray 44. After being removed from the tower 110, the FS-2000 viscosity product passes through the seventh heat exchanger 52. In the depicted embodiment, the seventh heat exchanger 52 is represented as a plurality of subheat exchangers 52a–52b. A portion of the FS-2000 viscosity product is returned to the tower 110 after passing through the seventh heat exchanger 52. As the remaining lighter fractions move toward the top of the tower 110, they are contacted with an MVGO (medium vacuum gas oil) spray which includes an FS-500 viscosity product. As the remaining lighter fractions move further toward the top of the tower 110, the FS-500 viscosity product is removed at the tray 54. After being removed from the tower 110, the FS-500 viscosity product passes through the third heat exchanger 33. In the depicted embodiment, the third heat exchanger 33 is represented as a plurality of subheat exchangers 33a–33b. A portion of the FS-500 viscosity product is returned to the tower 110 in the form of the MVGO spray after passing through the third heat exchanger 33. As the remaining lighter fractions continue to move toward the top of the tower 110, they are contacted with an LVGO (light vacuum oil) lower spray which includes an FS-100 viscosity product. As the remaining lighter fractions continue to move toward the top of the tower 110, the FS-100 viscosity product is removed from the tower 110 at the tray 64. After being removed from the tower 110, the FS-100 viscosity product passes through the second heat exchanger 32. In the depicted embodiment, the second heat exchanger 32 is represented as a plurality of subheat exchangers 32a–32b. A portion of the FS-100 viscosity product is returned to the tower 110 in the form of the LVGO lower spray after passing through the second heat exchanger 32. Another portion of the FS-100 viscosity product is returned to the tower 110 in the form of an LVGO top spray after passing through the second heat exchanger 32. As the remaining lighter fractions in the tower 110 continue to move toward the top of tower 110, they are contacted with the LVGO top spray that includes the FS-100 viscosity product. A vacuum is maintained at the top of tower 110 using a three stage steam jet to accelerate gases through a shaped manifold. Although the preferred embodiment shown in FIG. 2 represents all the subheat exchangers as sets of two subheat exchangers, it is within the level of ordinary skill in the art after having knowledge of the invention disclosed herein to subdivide each of the heat exchangers into any number of subheat exchangers.

Figure 3:
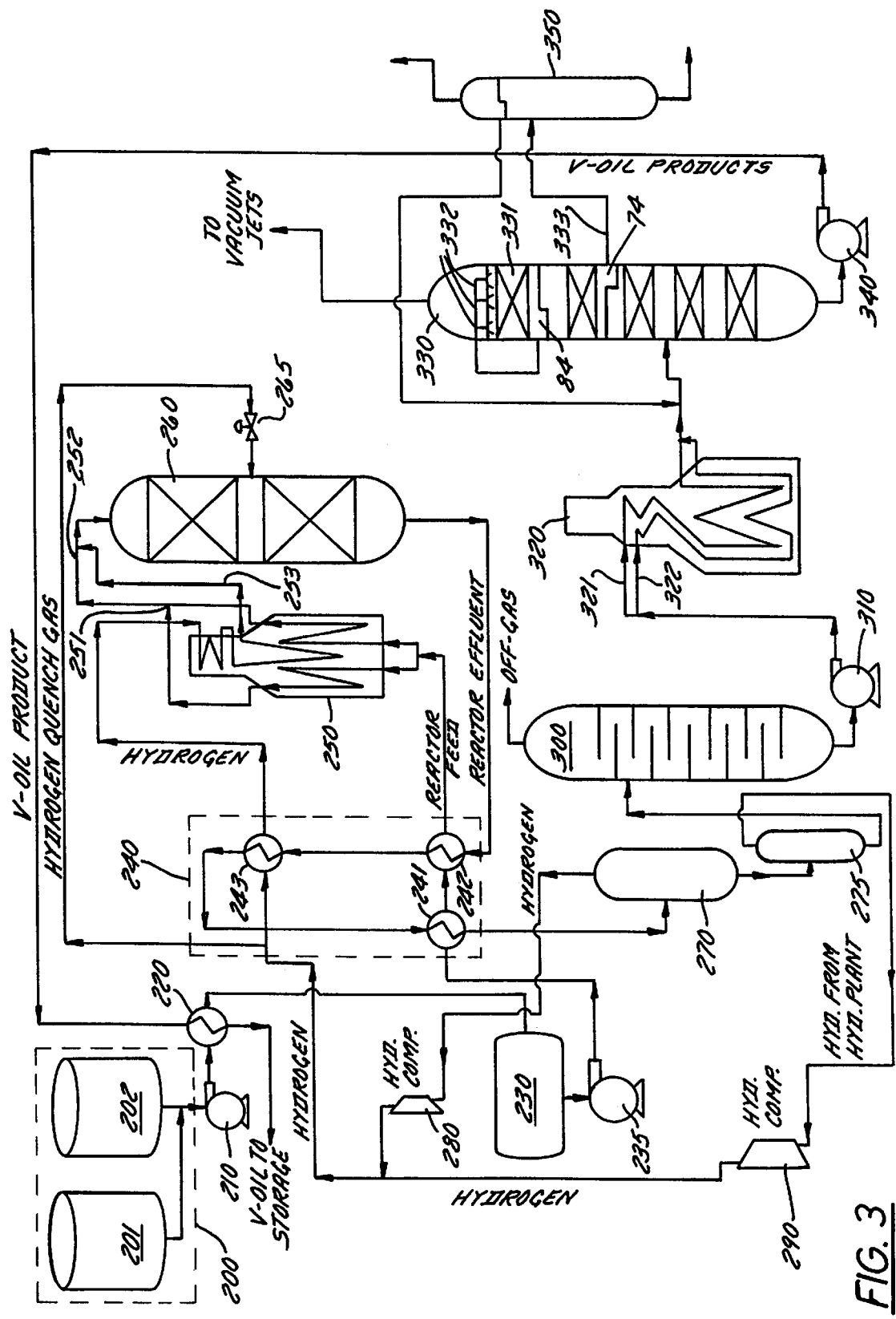
FIG. 3 illustrates a schematic view of a hydroprocessing unit (HPU) according to the present invention.

Referring now to FIG. 3, a plurality of block segregated viscosity fractions from the processes depicted in FIGS. 1–2 (FS-60, FS-100, etc.) are held in a group of feedstock tanks 200. The group of feedstock tanks 200 can include a first feedstock tank 201 for the FS-60 viscosity product. Similarly, the group of feedstock tanks 200 can include a second feedstock tank 202 for the FS-100 viscosity product. The FS-60 viscosity product and the FS-100 viscosity product are fed individually through a pump 210.

Still referring to FIG. 3, the feedstock flow from the pump 210 is conveyed to a heat exchanger 220. The heat exchanger 220 increases the temperature of the feedstock flow by transferring energy from a V-oil product to the feedstock flow. The feedstock flow is then routed to an oil surge drum 230. The feedstock flow emerges from the oil surge drum 230 at a pressure of from approximately 100 psi to approximately 150 psi. This increased pressure flow is then routed to an oil charge pump 235. Pump 235 should be a high pressure pump. The resulting high pressure feedstock flow is then routed to a third set of heat exchangers 240. The temperature of the high pressure feedstock flow is increased by a first heat exchanger 241 and then by a second heat exchanger 242 using energy from a reactor effluent. The resulting high temperature, high pressure feedstock flow composes a reactor feed that is conveyed to a reactor heater 250. The reactor heater 250 can be termed a charge heater and in the depicted embodiment, heater 250 includes two parallel feedstock flows at its lower end. The heater 250 also includes a hydrogen flow. The heater 250 includes two feedstock flows and a single feedstock flow. (the original which is described below). After emerging from the heater 250, the feedstock flows are recombined into a single line at a junction 251. The hydrogen flow 253 from the heater 250 is then combined with the recombined feedstock flow at a junction 252 and the resulting mixture is fed to a reactor 260. The purpose of the reactor 260 is to crack large molecules in the process flow. The temperature of the feedstock and hydrogen mixture that is fed to the reactor 260 should be from approximately 460° F. to approximately 800° F. The temperature of the output from the reactor 260 should be from approximately 550° F. to approximately 950° F. The total pressure within the reactor 260 should be from approximately 1650 psig (pounds per square inch gauge) to approximately 3000 psig. Of the total pressure within the reactor 260, the partial pressure of hydrogen should amount to from approximately 1500 psig to approximately 2500 psig. The reactor 260 includes a nonnobel intermetallic sulfide catalyst. This catalyst preferably includes one or more of nickel, molybdenum, cobalt and tungsten. The catalyst can also include phosphates. The hydrogen sulfide feed should be maintained at a level necessary to maintain the catalyst in a sulfide state. The reaction is exothermic. Additional hydrogen in the form of a quenched gas can be provided to the reactor 260 through a valve 265.

Still referring to FIG. 3, the effluent from the reactor 260 is routed to the third set of heat exchangers 240. After passing through the second heat exchanger 242, the effluent is further reduced in temperature by transferring energy to the hydrogen in a third heat exchanger 243 and directed to the first heat exchanger 241. After passing through the first heat exchanger 241, the reactor effluent is routed to a separator 270. Hydrogen gas is removed from the reactor effluent in the separator 270. The hydrogen that is obtained from the separator 270 can be routed to a hydrogen compressor 280 for subsequent reuse in the heater 250 and the reactor 260. The hydrogen concentration of gas from the compressor 280 should be from approximately 75 to approximately 99 mole percent hydrogen. The non gaseous product from the separator 270 can be routed to a second stage separator 275 at a pressure of from approximately 300 psi to approximately 400 psi. Hydrogen from the second stage separator 275 can then be routed to a compressor 290. The pressure of the hydrogen gas to the compressor 290 should be approximately 250 psi. The pressure of the hydrogen gas from the compressor 290 should be approximately 1500 psig to 3000 psig. The hydrogen concentration of the gas from the compressor 290 can be approximately 75 to 99.9 mole percent hydrogen. Additional hydrogen is provided to the heater 250 by the compressor 290.

Still referring to FIG. 3, the non gaseous flow from the second stage separator 275 is then routed to a stripper 300 at a pressure of from approximately 40 psi to approximately 70 psi. The function of the stripper 300 is to remove gas from the process stream. The off gasses from stripper 300 can include 1) $H_2S$; 2) light hydrocarbons; and 3) hydrogen gas. The liquid discharge from the stripper 300 is conveyed to a pump 310 in the form of water free oil. The discharge from the pump 310 is conveyed to a vacuum heater 320 at a pressure of approximately 100 psig. The vacuum heater 320 can be termed a charge heater and in the depicted embodiment includes a parallel flow of two streams 321 and 322. After recombination, the streams are fed to a vacuum tower 330. The tower 330 is a wet bottom fractionating column having a plurality of trays 74 and 84. The heaver fractions are removed from the tower 330 with a pump 340 and routed to the heat exchanger 220. The lighter fractions travel toward the top of the tower 330. The aromatic solvent having aliphatic properties according to the present invention is removed from the tower 330 through a side draw 333 the tray 74. The solvent is then routed to a side stripper tower 350. The light ends flash off in the side stripper tower 350 so as to be returned to the inlet of the tower 330 which is located below the tray 74. The resulting solvent according to the present invention is removed from the bottom of the tower 350. A vacuum is maintained at the top of the tower 350.

Still referring to FIG. 3, a vacuum is maintained at the top of the tower 330. A lighter fraction is removed from the tower 330 at the tray 84. This fraction is routed to an air cooler and then to a pump (both not shown) before being re-injected into the tower 330 in the form of a spray 332 above a packed section 331.

The Composition

Turning now to the composition itself, the composition contains both aliphatic and aromatic fractions. The aliphatic fraction can contain a paraffin fraction. The aromatic fraction can contain a naphthene fraction, and/or an alkylbenzene fraction, and/or an indane fraction (e.g. tetrahydronaphthalene (aka TETRALIN™)), and/or an indene fraction. The paraffin and naphthene fractions are not very good solvents, but they are stable. In contrast, the alkylbenzene, indane and indene fractions are good solvents, but they are not very stable. The combination of these fractions (optionally in specific quantitative ratios) provides an unexpected advantageous increase in the flash point of the composition. The increase in flash point is advantageous because it is indicative of synergistic stability which is a function of the fractions in the composition.

The paraffin fraction of the invention is generically defined to include the isoparaffins and the normal paraffins. The isoparaffins are aliphatic, saturated hydrocarbons containing one —CHMe— group or a side chain. The normal paraffins are aliphatic, saturated hydrocarbons containing only $CH_3$— and —$CH_2$— groups and can be represented as $C_nH_{2n+2}$. The paraffin fraction as determined by ASTM D-2425 should compose from approximately 9 liquid volume percent (LV %) to approximately 15 LV % of the composition.

The naphthene fraction of the invention is generically defined to include $C_nH_{2n}$. The naphthenes are cyclic hydrocarbons and are also know as hydroaromatics, cycloparaffins or hydrogenated benzenes from petroleum. These saturated ring structures are composed of the monocycloparaffins, the dicycloparaffins and the tricycloparaffins. These cyclic paraffins are saturated structures composed of 6 carbon ring structures and are very stable. The polycyclic naphthenes occur in the higher-boiling fractions. The naphthene fraction as determined by ASTM D-2425 should compose from approximately 35 LV % to approximately 55 LV % of the composition. More specifically, the weight percent of monocycloparaffins should be from approximately 0 LV % to approximately 30 LV %. The weight percent of dicycloparaffins should be from approximately 0 LV % to approximately 25 LV %. The weight percent of tricycloparaffins should be from approximately 0 LV % to approximately 20 LV %.

The alkylbenzene fraction of the invention is generically defined to include $C_nH_{2n+1} \cdot C_6H_5$. The alkylbenzene fraction as determined by ASTM D-2425 should compose from approximately 8 LV % to approximately 16 LV %.

The indane fraction of the invention is defined to include $C_{10}H_{12}$ (e.g., tetrahydronaphthalene (aka TETRALIN) $C_6H_4 \cdot C_4H_8$). The weight percent of indanes as determined by ASTM D-2425 should compose from approximately 9 LV % to approximately 15 LV %.

The indene fraction is defined to include $C_9H_8$. The weight percent of indene as determined by ASTM D-2425 should compose from approximately 0 LV % to approximately 10 LV %.

EXAMPLES

Specific embodiments of the present invention will now be further described by the following, nonlimiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Processing Data

Specific process parameter data obtained from samples periodically taken from a process flow of the composition according to the invention will now be presented. This data is based on the use of both a V-60 viscosity feedstock and a V-100 viscosity feedstock.

Figure 4:
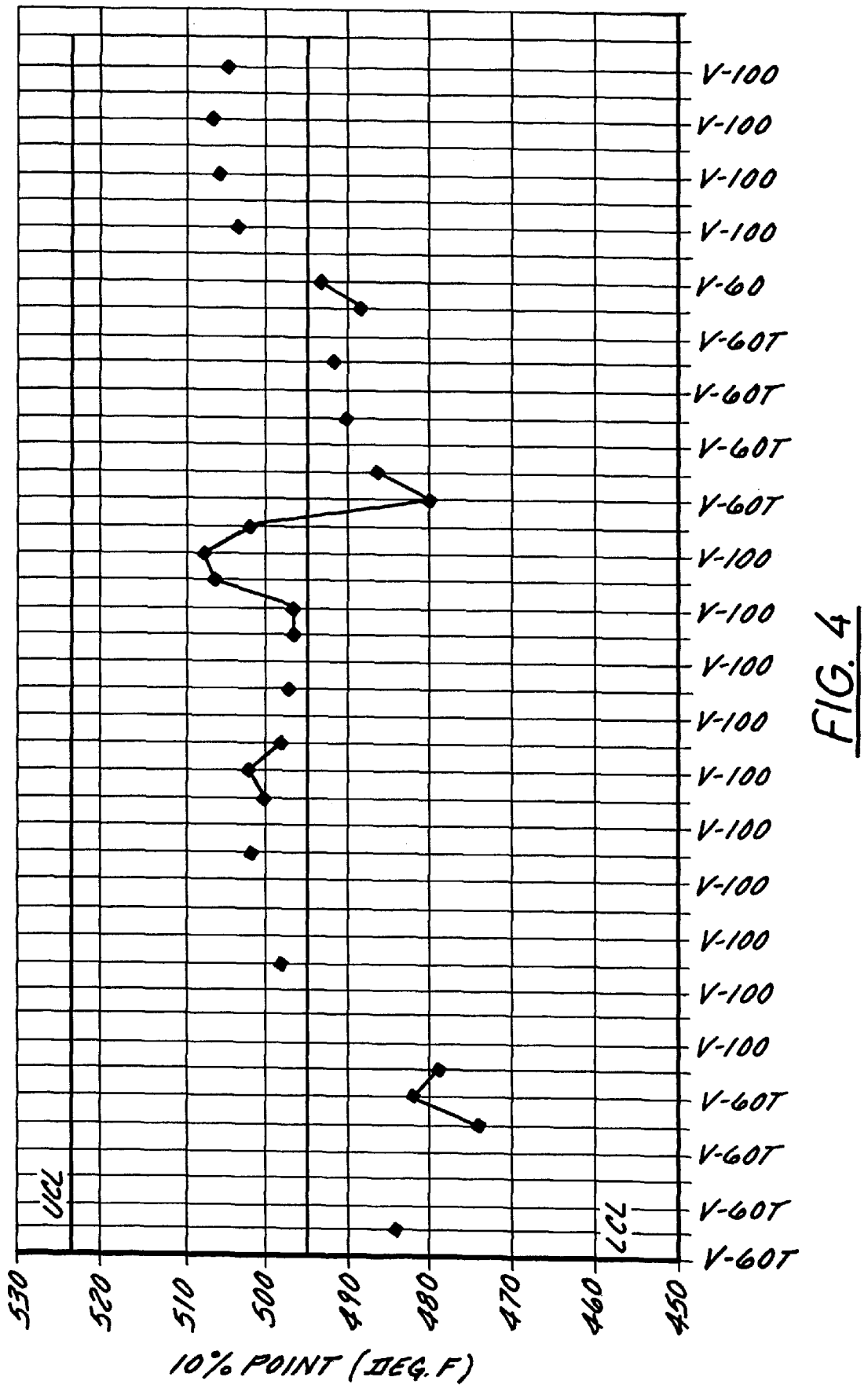
FIG. 4 illustrates the 10% distillation point in °F. as determined by ASTM D-86 as a function of feedstock viscosity of a composition process flow according to the present invention.

Referring now to FIG. 4, the temperature in degrees fahrenheit at which 10 wt % of samples taken periodically from a process flow of composition according to the invention is vaporized is illustrated as a function of feedstock viscosity. The effect of block segregating the V-60 and V-100 viscosity feedstock is evident in the finished composition. This determination of the 10% point was carried out in accordance with ASTM D-86. It was unexpectedly discovered that among the possible characteristics of the composition to monitor and control as an independent variable, control of the 10% point temperature unexpectedly permits an advantageously predictable operation of the process, thereby improving the quality of the composition.

It can be seen from FIG. 4 that the effect of increasing the viscosity of the feedstock is to increase the 10% point temperature. As noted above, the properties of the composition are advantageously maintained by controlling the 10% point as an independent variable. Preferably, the 10% point of the product should be maintained in a range of from approximately 480° F. to approximately 510° F. In particularly preferred embodiments of the invention, the 10% point is maintained in a range of from approximately 490° F. to approximately 500° F.

Figure 5:
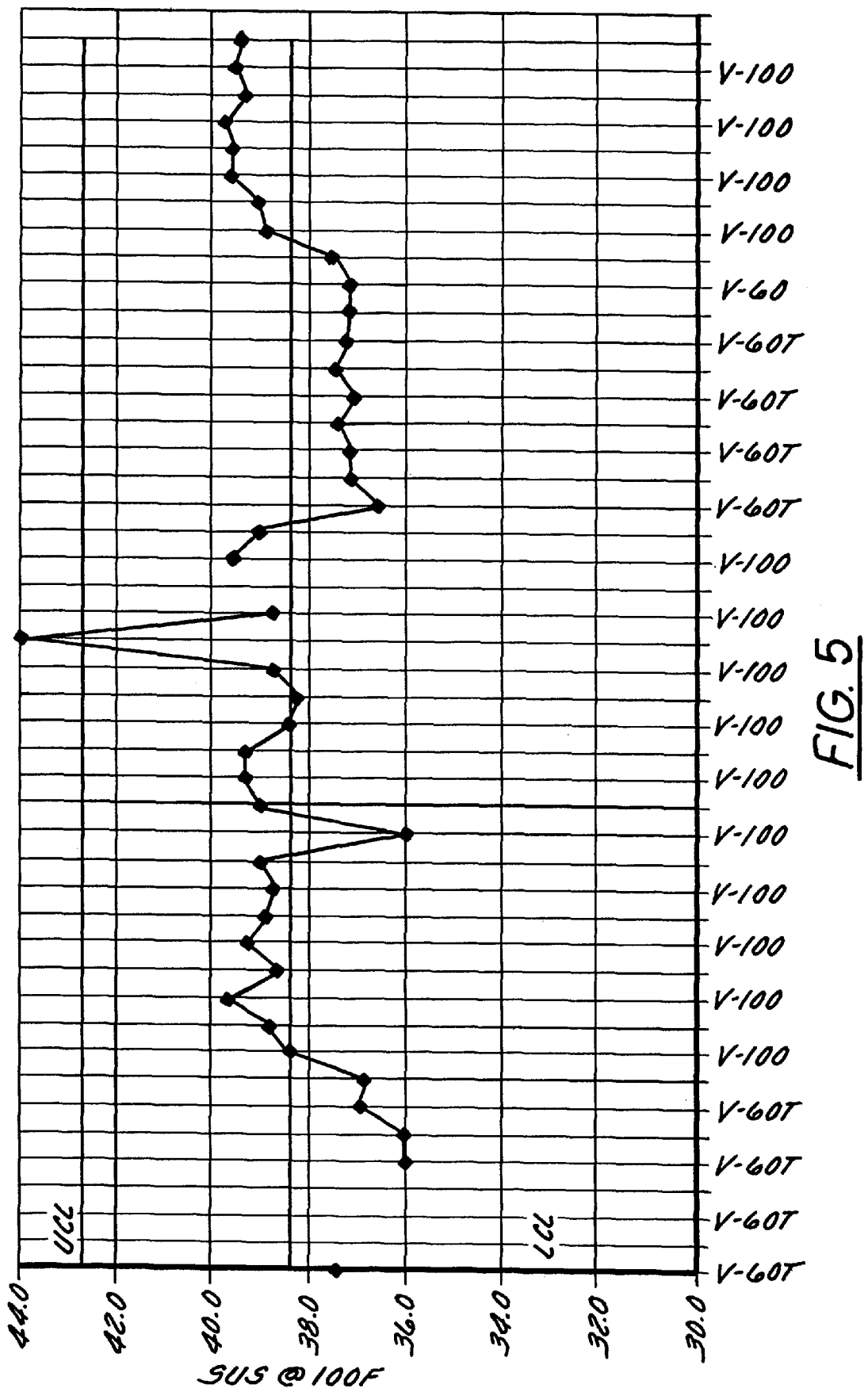
FIG. 5 illustrates the viscosity in units of Saybolt Universal Seconds (SUS) at 100° F. as determined by ASTM D-2161 as a function of feedstock viscosity of a composition process flow according to the present invention.

Referring now to FIG. 5, the viscosity of samples taken periodically from a process flow of composition according to the present invention is illustrated as a function of the viscosity of the feedstock. The viscosity of the product is plotted in units of SUS (Saybolt Universal Seconds) at 100° F. This determination of viscosity was conducted in accordance with ASTM D-2161.

It can be seen from FIG. 5 that the effect of increasing the viscosity of the feedstock is to increase the viscosity of the resultant solvent. Although the upper control limit and lower control limit are depicted in FIG. 5 as approximately 43 SUS and approximately 33 SUS, respectively, it is preferred that the viscosity of the product be from approximately 34 SUS to approximately 42 SUS. The maintenance of the product viscosity within this preferred range is advantageously controlled by maintaining the 10% distillation point within its independent variable range.

Figure 6:
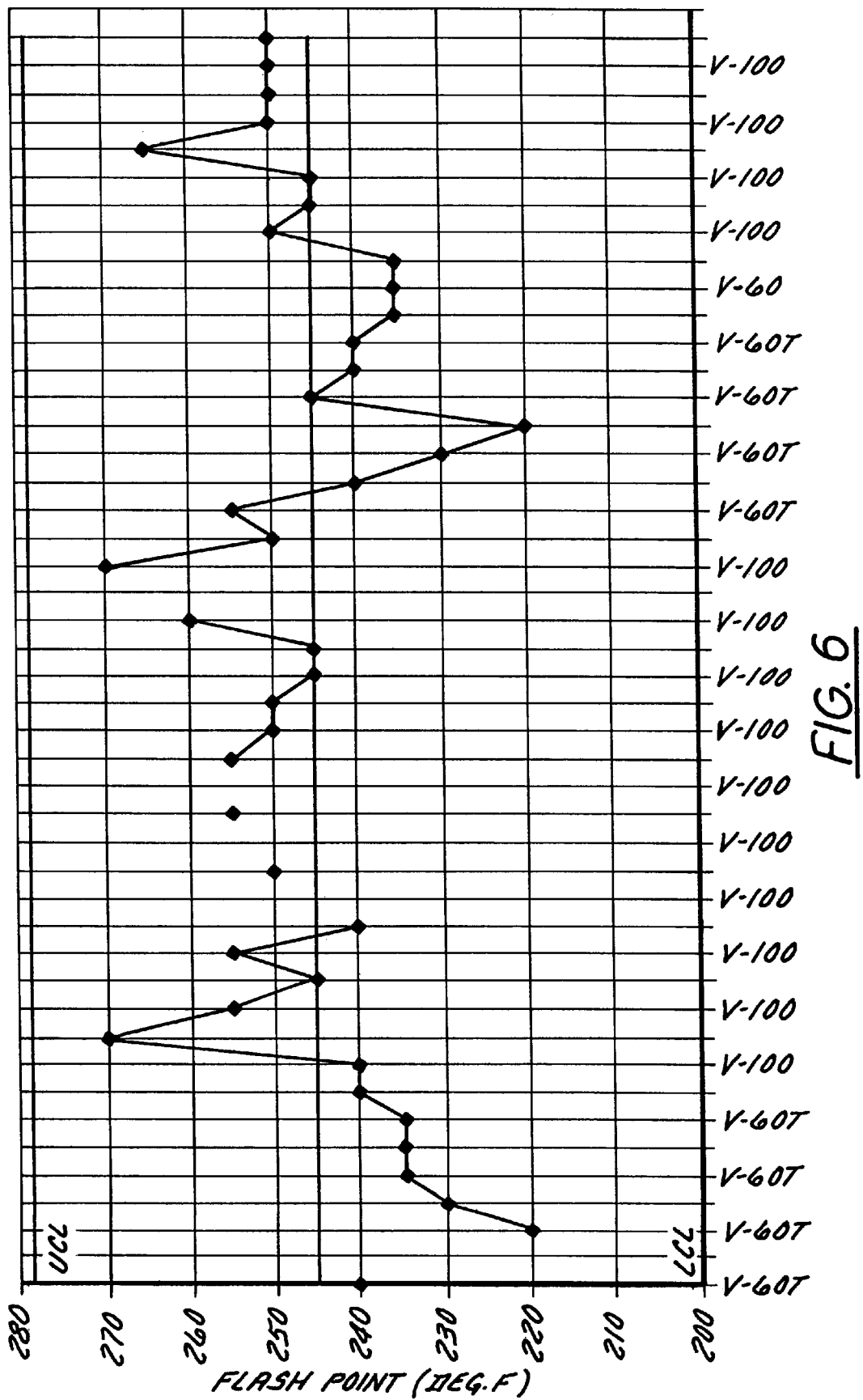
FIG. 6 illustrates the flash point in °F. as determined by ASTM D-92 as a function of feedstock viscosity for a composition process flow according to the present invention.

Referring now to FIG. 6, the flash point of samples taken periodically from a process flow of composition according to the present invention is shown as a function of the feedstock viscosity. The flashpoint value is depicted in FIG. 6 in units of degrees fahrenheit. The determination of the flashpoint was carried out in accordance with ASTM D-92. By definition the flashpoint is the lowest temperature at which the composition will disassociate into volatile components.

It can be seen from FIG. 6 that the effect of increasing the viscosity of the feedstock is to increase the flashpoint of the solvent. It should be noted that before taking the side draw from the wet bottom vacuum fractionating column, the flashpoint of the off-gassed composition precursor is much lower. For example, the flashpoint of the composition precursor, before any side draw is taken from the wet bottom vacuum fractionating column, is from approximately 90° F. to approximately 100° F. It will be appreciated from FIG. 6 that the flash point of samples taken from the side draw is from approximately 220° F. to approximately 270° F. Although some increase in the flashpoint was expected due to the distillation nature of the side draw, the actual increase in flashpoint was far higher than expected. Thus, it was discovered that the stability of the composition was far better than was to be expected. Specifically, it was completely unexpected that the increase in flashpoint would be more than 100° F.

Figure 7:
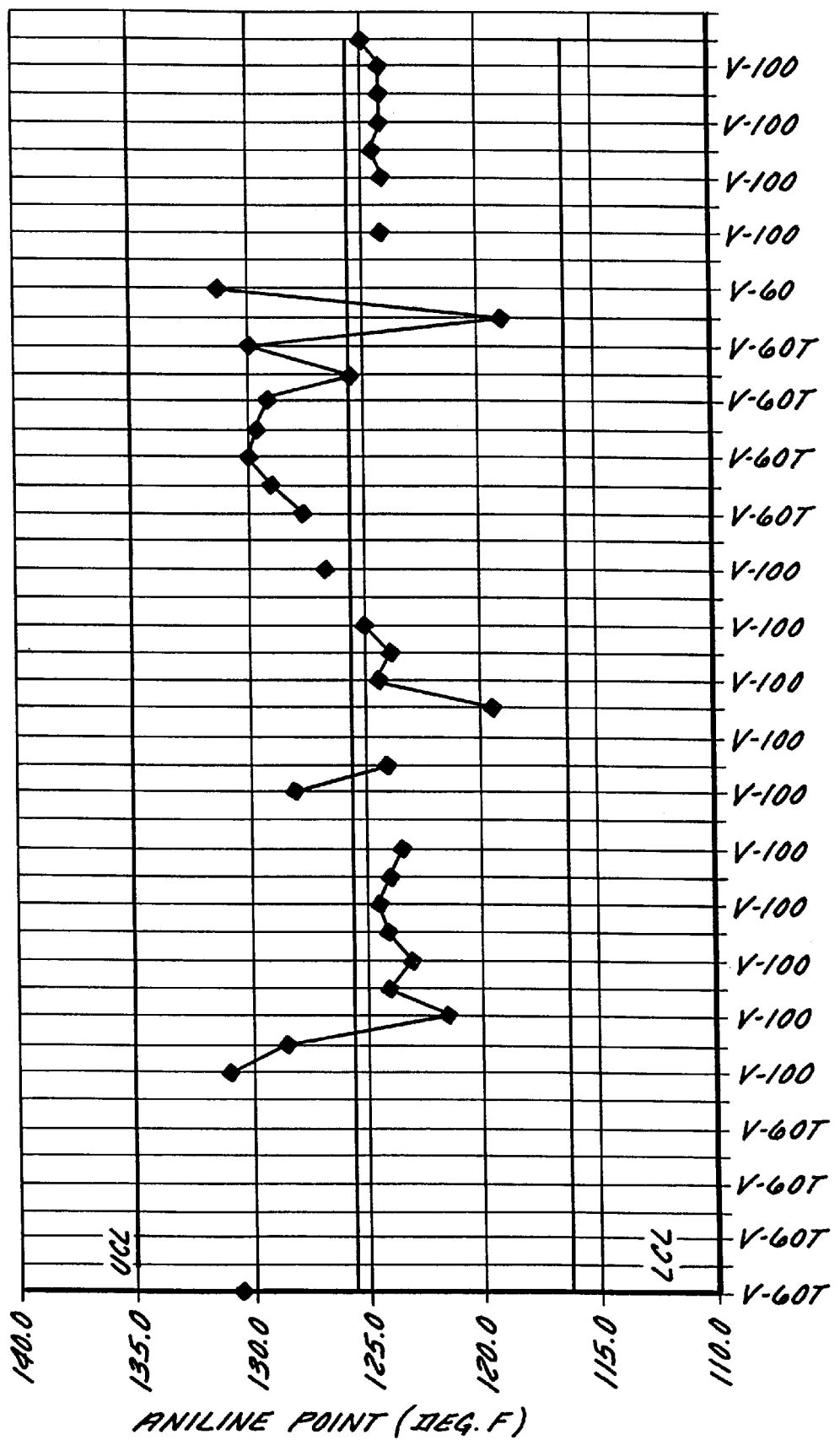
FIG. 7 illustrates the aniline point in °F. as determined by ASTM D-611 as a function of feedstock viscosity for a composition process flow according to the present invention.

Referring now to FIG. 7, the aniline point of samples taken periodically from a process flow of composition according to the present invention is depicted as a function of feedstock viscosity. The aniline point plotted in FIG. 7 is depicted in units of degrees fahrenheit. The aniline point was determined in accordance with ASTM D-611. By definition, the aniline point is the critical solution temperature (highest temperature of immiscibility) for a mixture of aniline and the composition.

It can been seen from FIG. 7 that the effect of increasing the viscosity of the feedstock material is to lower the aniline point of the solvent. The aniline point is a good indicator of the solvent power of the composition. The lower the aniline point, the greater the solvent power of the composition. (This is in contrast to the Kauri-Butanol Value (KB point) where the higher the KB point is, the greater the solvent power). Higher solvent power means that a composition will be more effective as a carrier and/or as a diluent and/or as a co-solvent. The aniline point gives data representative of the total chemistry of the composition.

Figure 8:
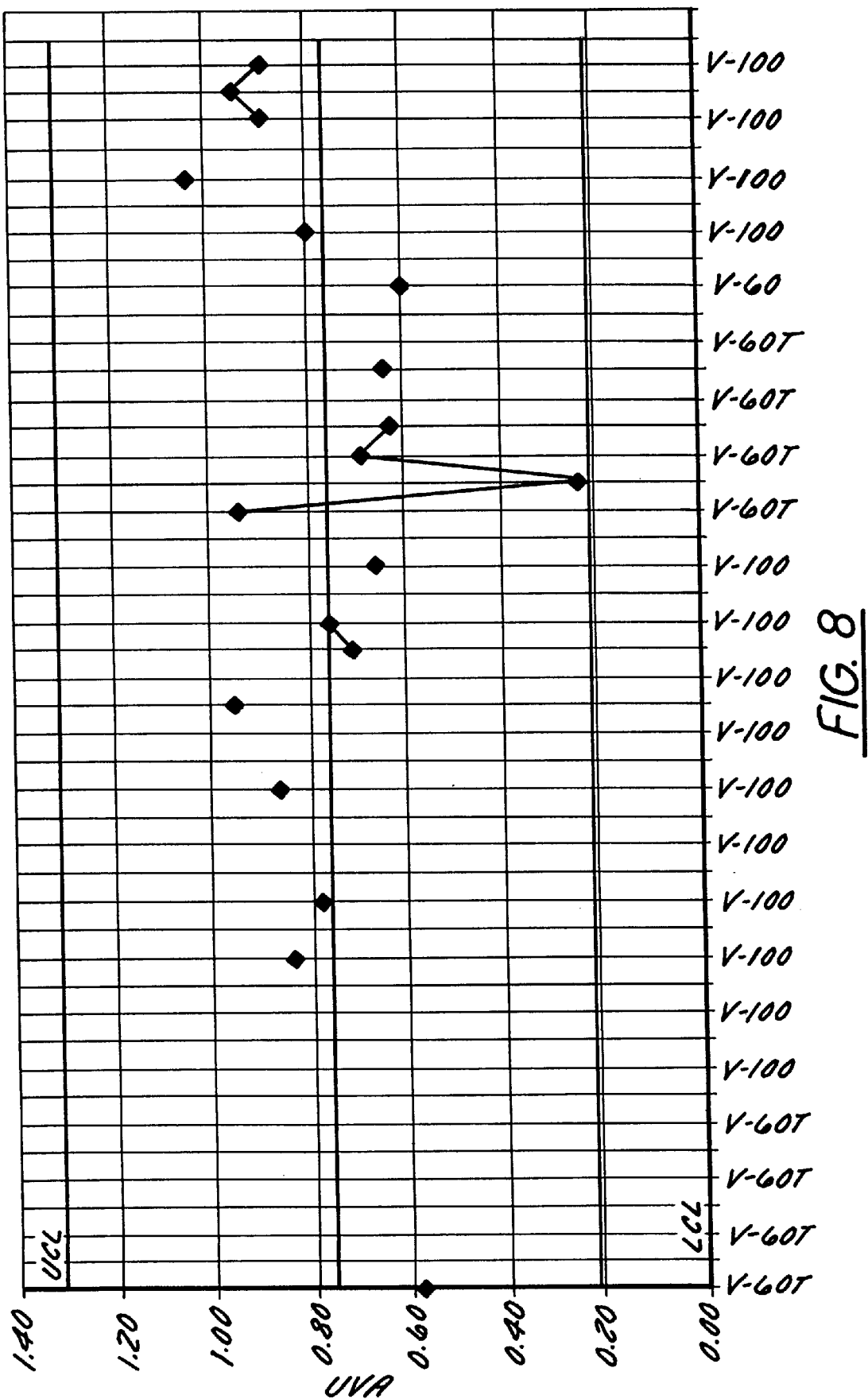
FIG. 8 illustrates the ultraviolet absorption coefficient as determined by ASTM D-2008 as a function of feedstock viscosity for a composition process flow according to the present invention.

Referring now to FIG. 8, the ultraviolet absorption (UVA) of samples taken periodically from a process flow of composition according to the present invention is shown as a function of the feedstock viscosity. The ultraviolet absorbance was determined in accordance with ASTM D-2008. Therefore, absorbance values depicted in FIG. 8 were obtained with an incident wavelength of 260 nm.

It can be seen from FIG. 8 that the effect of increasing the feedstock viscosity is to increase the UVA of the solvents according to the present invention. The UVA data at 260 nm represents the proportion of light aromatics (molecules containing from approximately 15 carbon atoms to approximately 20 carbon atoms) in the composition.

Analytic Data

Specific qualitative and quantitative data from samples of the composition prepared according to the invention will now be presented. The data is based on compositions obtained using a V-60 viscosity feedstock, a V-100 viscosity feedstock and a 50/50 blend of V-60 and V-100 feedstock.

Referring to Table I, (set forth below) data characterizing samples of the composition according to the present invention is presented. The first column of data is from a composition prepared with a V-60 viscosity feedstock. The second column of data is from a composition prepared with a V-100 viscosity feedstock. It will be appreciated that many characteristics of the composition according to the present invention are functions of the viscosity of the feedstock material. As noted earlier, the feedstock material is carefully block segregated from crude oil.

TABLE I

| FEEDSTOCK | V-60 | V-100 |
|---|---|---|
| Viscosity, SUS @ 100° F. | 38.4 | 38.1 |
| Viscosity, SUS @ 210° F. | <32.0 | <32.0 |
| Gravity, API | 28.2 | 30.2 |
| Specific Gravity | 0.8863 | 0.8751 |
| Flash Point, COC, ° F. | 250/245 | 235/235 |
| Color, ASTM | <0.5 | <0.5 |
| Aniline Point, ° F. | 158.5 | 152.1 |
| Pour Point, ° F. | >−80 | >−70 |
| Sulfur, wt % | 0.0064 | 0.0054 |
| UVA @ 260 nanometers | 0.892 | 0.793 |
| Refractive Index | 1.4852 | 1.4790 |
| Water Content (subjective test) | PASS | PASS |
| Appearance | FAIL | FAIL |
| Distillation ASTM D-86 ° F. | | |
| initial boiling point | 476 | 484 |
| 5% | 483 | 495 |
| 10% | 484 | 498 |
| 30% | 489 | 504 |
| 50% | 494 | 509 |
| 70% | 503 | 517 |
| 90% | 521 | 532 |
| 95% | 536 | 543 |
| End Point | 549 | 548 |
| Recovery | 97.5% | 97.7% |
| FDA Part B | | |
| Wavelength (nanometers) | | |
| 280–289 (4.000 max) | 0.514 | 0.516 |
| 290–299 (3.300 max) | 0.510 | 0.511 |
| 300–329 (2.300 max) | 0.096 | 0.151 |
| Clay Gel Analysis | | |
| wt % Asphaltenes | <0.1 | <0.1 |
| wt % Saturates | 64.9 | 62.4 |
| wt % Aromatics | 34.5 | 37.2 |
| wt % Polars | 0.6 | 0.4 |
| Inerfacial tension (dynes/cm) | 46 | 43 |
| Evaporation wt % | 97.5% | 94.8% |
| Auto Pour Point | −95° | −90° |

The specific gravity was determined in accordance with ASTM D-287. COC is an acronym for Cleveland Open Cup (ASTM D-92). The distillation temperatures were determined in accordance with ASTM D-86. The FDA Part 2 wavelength results indicate that the composition satisfies the requirements of Food and Drug Administration regulation 21 CFR 178.3620(b). The evaporation data is in percent mass and was determined in accordance with ASTM D-972. The auto pour point was determined in accordance with ASTM D-97 with automatic apparatus and is given in degrees fahrenheit. By definition, the auto pour point is the lowest temperature at which the composition will flow under its own weight.

Referring to Table II, (set forth below) more data characterizing samples of the composition according to the present invention is presented. The first column of data is from a composition prepared with a V-60 viscosity feedstock. The second column of data is from a composition prepared with a V-100 viscosity feedstock. The third column of data is from a 50/50 blend of a first composition prepared with a V-60 feedstock and a second composition prepared with a V-100 feedstock. It will be noted that the properties of the composition obtained from the blend are intermediate the endpoints obtained from the samples of the composition obtained from the individual block segregated feedstocks.

TABLE II

| Feedstock | V-60 | V-100 | 50/50 Blend |
| --- | --- | --- | --- |
| Physical Characteristics: | | | |
| Viscosity, cSt @ 100° F. | 3.44 | 4.06 | 3.68 |
| Viscosity, SUS @ 100° F. | 37.4 | 39.4 | 38.2 |
| Viscosity, cSt @ 140° F. | 2.21 | 2.41 | 2.32 |
| Viscosity, SUS @ 140° F. | | | |
| API Gravity, 60° F. | 29.6 | 27.8 | 28.7 |
| Specific Gravity | 0.8783 | 0.8883 | 0.8833 |
| Color, ASTM | <0.5 | <0.5 | <0.5 |
| Flash, COC, ° F. | 255 | 255 | 260 |
| Refractive Index | 1.4805 | 1.4851 | 1.4834 |
| Aniline Point, ° F. | 129.2 | 124.4 | 126.6 |
| Sulfur, wt. % | .0042 | .0032 | |
| Auto Pour, ° F. | −95 | −95 | −100 |
| UVA @ 260 nm | 0.80 | 0.67 | 0.73 |
| Distillation: | | | |
| initial boiling point | 481 | 488 | 483 |
| 5% | 488 | 498 | 493 |
| 10% | 489 | 501 | 495 |
| 30% | 494 | 507 | 501 |
| 50% | 499 | 514 | 506 |
| 70% | 505 | 523 | 514 |
| 90% | 517 | 541 | 531 |
| 95% | 526 | 553 | 541 |
| End Point | 542 | 572 | 561 |
| % Recovery | 98.6 | 98.8 | 99 |
| interfacial tension @ 25° C. | 42 | 43 | 40 |

Referring to Table III, (set forth below) more data characterizing samples of the composition according to the present invention is presented. The first column of data is from a composition prepared with a V-60 viscosity feedstock. The second column of data is from a composition prepared with a V-100 viscosity feedstock. It will be appreciated that the composition contains both aliphatic and aromatic fractions.

TABLE III

| FEEDSTOCK | V-60 | V-100 |
| --- | --- | --- |
| PONA by mass spec & FIA(ASTM D-2789) | | |
| Paraffins LV % | 13.72 | 10.66 |
| Olefins LV % | 8.30 | 10.80 |

TABLE III-continued

| FEEDSTOCK | V-60 | V-100 |
| --- | --- | --- |
| Monocycloparaffins LV % | 28.35 | 24.97 |
| Dicycloparaffins LV % | 23.58 | 23.81 |
| Alkylbenzenes LV % | 14.77 | 16.35 |
| Indanes LV % | 913 | 10.87 |
| Napthalenes LV % | 2.15 | 2.54 |
| Unsulfonated Residue LV % (ASTM D-483) | 98 | 92 |

The liquid volume (LV) percentages given in Table III were determined by mass column spectrophotometry.

Referring to Table IV, (set forth below) more data characterizing samples of the composition according to the present invention is presented. All the data in Table IV is from a 50/50 blend of a first composition prepared with a V-60 feedstock and a second composition prepared with a V-100 feed stock. All of the data in Table IV is given in percent of liquid volume (LV %).

TABLE IV

| Test Description | Final Result | Limits/Dilution | Units of Measure |
| --- | --- | --- | --- |
| Hydrocarbon Type | | 1 | |
| Aromatics | 16.6 | 0.2 | L.V. % |
| Olefins | 20.7 | 0.2 | L.V. % |
| Saturates | 62.7 | 0.2 | L.V. % |
| Kauri-Butanol Value | 41 | | |
| PNA Middle Distillates, Mass Spec | | 1 | |
| Paraffins | 12.70 | 0 | LV % |
| Monocycloparaffins | 0.00 | 0 | LV % |
| Dicycloparaffins | 24.29 | 0 | LV % |
| Tricycloparaffins | 15.97 | 0 | LV % |
| Alkylbenzenes | 8.89 | 0 | LV % |
| Indanes | 11.57 | 0 | LV % |
| Indenes | 4.10 | 0 | LV % |
| Naphthalene | 0.00 | 0 | LV % |
| Napthalenes | 0.23 | 0 | LV % |
| Acenaphthenes | 0.74 | 0 | LV % |
| Accnaphtholenes | 0.39 | 0 | LV % |
| Tricyclic Aromatics | 0.42 | 0 | LV % |
| Total | 79.3 | 0 | LV % |
| Unsulfonated Residue | 96 | | LV % |

The hydrocarbon types were determined in accordance with ASTM D-1319. The hydrocarbon type gives a gross description of the composition.

The Kauri-Butanol Value was determined in accordance with ASTM D-1133. The Kauri-Butanol value gives a quantitative index to the solvent power of the composition.

The PNA Middle Distillates were determined with mass spectrophotometry in accordance with ASTM D-2425. The paraffins, monocycloparaffins, dicycloparaffins, and tricycloparaffins are all relatively poor solvents but provide the composition with the desirable characteristics of a high boiling range and a high flashpoint. The alkylbenzenes, indanes and indenes are aromatic compounds that provide the invention with relatively high solvent power, but which ordinarily have narrow boiling ranges and low flashpoints.

The Unsulfonated Residue was determined in accordance with ASTM D-483. The unsulfonated residue test gives an indication of the amount of sulfur in the feedstock.

The invention is directed to a class of naphthenic solvents derived from the hydroprocessing of naphthenic lubricant feedstocks by further processing a previously unused by-product stream. The invention is a new and previously unavailable aromatic solvent having aliphatic solvent characteristics. Solvents according to the invention can meet the requirements of Food and Drug Administration regulations (e.g., 21 CFR 178.3620(b)).

This new class of solvents offers a high solvency that is typical of an aromatic solvent as defined by a low aniline point and a high Kauri-Butanol (KB) value. This new class of solvents also offers the advantages of a high flash point and a relatively wide boiling range thus making them applicable to a wide variety of applications. The property of high solvency allows the invention to effectively act as a vehicle for a relatively high loading of solute. The high flash point allows the invention to resist decomposition into volatile gases at relatively higher temperatures, thereby enhancing safety and the working temperature ranges of corresponding solutions. The narrow boiling range allows the invention to maintain some degree of solution dispersion. The high boiling characteristics helps to maintain a high degree of control across a wider temperature range as the solvent slowly evaporates, thereby enhancing the mobility and penetrative capability of corresponding solutions under typical working conditions. The boiling range is defined as the range in temperature through which a liquid is transformed to a vapor. The boiling range is a function of pressure and often some residual material remains in solid form. The flash point is defined as the lowest temperature at which the vapors of an oil will decompose to a flammable gaseous mixture. The flash point is a constant of oils. High solvency is defined by low aniline points and high KB values.

A practical application of the present invention which has value within the technological arts is as a lubricant for high speed metal rolling. Further, all the disclosed embodiments of the present invention are useful as solvents in conjunction with compositions such as are used for the purpose of herbicides, insecticides (e.g., termitecides) and inks, or for the purpose of adhesives, or the like. There are virtually innumerable uses for the present invention described herein, all of which need not be detailed here.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that, within the scope of the appended claims, the invention may be practiced otherwise than as specifically described herein.

For example, the performance of the composition could be enhanced by providing additional refining steps. In addition, the individual steps involved in preparing the compositions need not be carried out in the disclosed sequence, but could be carried out in virtually any suitable sequence.

Moreover, although the composition described herein is a physically separate material, it will be manifest that the composition may be mixed with other materials with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. A method of making a solvent, the method comprising the steps of:

charging a reactor with at least one block segregated feedstock and hydrogen;

reacting the at least one block segregated feedstock with the hydrogen in said reactor to produce a reacted feedstock and hydrogen sulfide;

transferring the reacted feedstock and hydrogen sulfide from said reactor to a steam stripping tower;

stripping said hydrogen sulfide from said reacted feedstock, transferring the desulfurized reacted feedstock from said steam stripping tower to a wet bottom vacuum fractionating column having a side draw; and drawing said solvent from said side draw.

2. A method, comprising the steps of:

providing a wet bottom vacuum fractionating column with a side draw;

charging said wet bottom vacuum fractionating column from a source of desulfurized reacted feedstock; and drawing a composition from said side draw, wherein said composition includes a paraffin fraction in an amount of from approximately 9 LV % to approximately 15 LV %;

a naphthene fraction in an amount of from approximately 35 LV % to approximately 55 LV %;

an alkylbenzene fraction in an amount of from approximately 8 LV % to approximately 16 LV %.

3. The method of claim 2, wherein said step of drawing includes controlling a temperature of said wet bottom vacuum fractionating column with an air cooled recirculation spray.

4. The method of claim 2, further comprising the step of feeding said composition to a side stripper tower.

5. The method of claim 2, wherein said source of desulfurized feedstock is prepared by hydroprocessing a block segregated feedstock.

6. The method of claim 2, further comprising the step of providing a block segregated feedstock from which said source of desulfurized feedstock is obtained.

7. The method of claim 2, wherein said composition i) further includes an indane fraction in an amount of from approximately 9 LV % to approximately 15 LV %, and ii) is characterized by an ASTM D-86 10 percent point of from approximately 480° F. to approximately 510° F.

8. A method of making a solvent comprising the steps of:

flowing a block segregated feedstock and hydrogen into a reactor;

reacting the block segregated feedstock and hydrogen to form hydrogen sulfide and reacted block segregated feedstock;

transferring the reacted block segregated feedstock and hydrogen sulfide from the reactor to a steam stripping tower;

stripping the hydrogen sulfide to form a desulfurized reacted block segregated feedstock;

transferring the desulfurized reacted block segregated feedstock from the steam stripping tower to a wet bottom vacuum fractionating column with a side draw; and drawing the solvent from the side draw of the wet bottom vacuum fractionating column, wherein the solvent includes between about 9 LV % and 15 LV % of a paraffin fraction, between about 35 LV % and 55 LV % of a naphthene fraction, and between about 8 LV % and 16 LV % of an alkylbenzene fraction, the solvent characterized by an ASTM D-86 percent point of between about 480° F. and 510° F.

9. The method of claim 8, wherein the solvent further includes between about 9 LV % and 15 LV % of an indane fraction.

10. The method of claim 9, wherein the solvent further includes between about 1 LV % and 5 LV % of an indene fraction, and wherein the solvent is characterized by an ASTM D-86 10 percent point between about 490° F. and 500° F.

11. The method of claim 8, wherein the feedstock and hydrogen are flowed into a reactor in which a partial pressure of hydrogen between about 1650 psig and 3000 psig is present.

12. The method of claim 8, wherein the feedstock and hydrogen are flowed into a reactor in which a partial pressure of hydrogen between about 1500 psig and 2500 psig is present.

13. The method of claim 8, wherein the feedstock and hydrogen are flowed into a reactor, the reactor including a nonnobel intermetallic sulfide catalyst.

14. The method of claim 13, wherein the nonnobel intermetallic sulfide catalyst includes a metal sulfide selected from the group consisting of nickel sulfide, molybdenum sulfide, cobalt sulfide, tungsten sulfide, and any combination thereof.

15. The method of claim 8, wherein the block segregated feedstock is a first of a plurality of block segregated feedstocks which are flowed into the steam stripping tower.

16. The method of claim 15, wherein the first block segregated feedstock is characterized by a FS-60 viscosity.

17. The method of claim 15, wherein a second of the plurality of block segregated feedstocks is characterized by a FS-100 viscosity.

18. The method of claim 8, further comprising the step of heating the feedstock before flowing the feedstock into the reactor.

19. The method of claim 4, further comprising the step of heating the hydrogen before flowing the feedstock and hydrogen into the reactor.

20. The method of claim 8, further comprising the step of heating the feedstock and at least some of the hydrogen before the feedstock and hydrogen are flowed into the reactor.

21. The method of claim 20, wherein the feedstock and heated hydrogen are heated to a temperature between about 460° F. and 800° F.

22. The method of claim 8, further comprising the step of passing the feedstock and hydrogen sulfide through at least one separator before the feedstock and hydrogen sulfide are transferred to the steam stripping tower.

23. The method of claim 8, further comprising the step of heating the feedstock before it is flowed into the wet bottom vacuum fractionating column.

24. A method of making a solvent, the method comprising the steps of:
combining at least one block segregated viscosity fraction and hydrogen;
reacting the at least one block segregated viscosity fraction and hydrogen in a reactor, thereby producing a mixture of reacted feedstock and excess hydrogen;
separating at least a portion of the excess hydrogen from the reacted feedstock;
stripping off gases from the reacted feedstock;
transferring the stripped, reacted feedstock to a wet bottom fractionating column with a side draw; and
drawing the solvent from the side draw.

25. The method of claim 24, wherein the solvent includes between about 9 LV % and 15 LV % of a paraffin fraction, between about 35 LV % and 55 LV % of a naphthene fraction, and between about 8 LV % and 16 LV % of an alkylbenzene fraction, and wherein the solvent is characterized by an ASTM D-86 10 percent point between about 480° F. and 510° F.

26. The method of claim 25, wherein the solvent further includes between about 9 LV % and 15 LV % of an indane fraction.

27. The method of claim 26, wherein the solvent further includes between about 1 LV % and 5 LV % of an indene fraction, and wherein the solvent is characterized by an ASTM D-86 10 percent point of between about 490° F. and 500° F.

28. A method of making a solvent from at least one block segregated feedstock, the method comprising the steps of:
providing a heated and desulfurized feedstock;
flowing the heated and desulfurized feedstock into a wet bottom fractionating column with a side draw, thereby separating the solvent from a remainder of the feedstock; and
recovering the separated solvent from the side draw,
the solvent including between about 9 LV % and 15 LV % of a paraffin fraction, between about 35 LV % and 55 LV % of a naphthene fraction, and between about 8 LV % and 16 LV % of an alkylbenzene fraction, and wherein the solvent is characterized by an ASTM D-86 10 percent point of between about 480° F. and 510° F.

29. The method of claim 28, wherein the solvent further includes between about 9 LV % and 15 LV % of an indane fraction.

30. The method of claim 29, wherein the solvent further includes between about 1 LV % and 5 LV % of an indene fraction, and wherein the solvent is characterized by an ASTM D-86 10 percent point between about 490° F. and 500° F.

31. The method of claim 28, further comprising the steps of:
routing the recovered solvent into a side stripper tower; and
removing the solvent from the side stripper tower.

* * * * *